United States Patent
Essmann et al.

(10) Patent No.: US 10,503,681 B2
(45) Date of Patent: Dec. 10, 2019

(54) INTERNET PROTOCOL (IP)-ENABLED SMART TRANSDUCER

(71) Applicant: HONEYWELL INTERNATIONAL INC., Morris Plains, NJ (US)

(72) Inventors: Roland Essmann, Osnabruck (DE); Darek Kominek, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 9 days.

(21) Appl. No.: 15/478,936

(22) Filed: Apr. 4, 2017

(65) Prior Publication Data

US 2018/0285306 A1 Oct. 4, 2018

(51) Int. Cl.
*G06F 13/42* (2006.01)
*H04L 12/40* (2006.01)
*G05B 19/042* (2006.01)

(52) U.S. Cl.
CPC ....... *G06F 13/4208* (2013.01); *G05B 19/042* (2013.01); *H04L 12/40123* (2013.01); *G05B 2219/25145* (2013.01); *Y02P 80/30* (2015.11)

(58) Field of Classification Search
None
See application file for complete search history.

(56) References Cited

U.S. PATENT DOCUMENTS

| | | | |
|---|---|---|---|
| 7,302,485 B2 | 11/2007 | Bauer et al. | |
| 9,697,355 B1 * | 7/2017 | Park | G06F 21/552 |
| 2016/0330825 A1 | 11/2016 | Recker et al. | |
| 2018/0051823 A1 * | 2/2018 | Coleman | F16K 37/00 |
| 2018/0107230 A1 * | 4/2018 | Sai | G05D 7/06 |

* cited by examiner

*Primary Examiner* — Henry Tsai
*Assistant Examiner* — Aurangzeb Hassan

(57) ABSTRACT

An Internet Protocol (IP)-enabled smart transducer includes a sensor for generating field data regarding a physical quantity associated with processing equipment or a device in an industrial processing facility, and a signal conditioning circuit for at least one of amplifying and filtering the field data to provide conditioned field data. A communications interface is coupled to the signal conditioning circuit including a processor having an associated memory and a field data to IP data conversion algorithm for generating the IP data from the conditioned field data, and a transmitter is for transmitting the IP data across an IP bus to at least one application connected to the IP bus.

20 Claims, 3 Drawing Sheets

300

301
PROVIDING AN INTERNET PROTOCOL (IP)-ENABLED SMART TRANSDUCER INCLUDING A SENSOR COUPLED TO PROCESSING EQUIPMENT OR A DEVICE IN AN INDUSTRIAL PROCESSING FACILITY, A SIGNAL CONDITIONING CIRCUIT COUPLED TO AN OUTPUT OF THE SENSOR, A COMMUNICATIONS INTERFACE COUPLED TO THE SIGNAL CONDITIONING CIRCUIT IMPLEMENTING FIELD DATA TO IP DATA CONVERSION ALGORITHM, AND A TRANSMITTER.

302
THE SENSOR GENERATING THE FIELD DATA REGARDING A PHYSICAL QUANTITY ASSOCIATED WITH THE PROCESSING EQUIPMENT OR DEVICE.

303
THE SIGNAL CONDITIONING CIRCUIT PROVIDING AT LEAST ONE OF AMPLIFYING AND FILTERING THE FIELD DATA TO PROVIDE CONDITIONED FIELD DATA.

304
THE FIELD DATA TO IP DATA CONVERSION ALGORITHM GENERATING IP DATA FROM THE CONDITIONED FIELD DATA.

305
THE TRANSMITTER TRANSMITTING THE IP DATA ACROSS AN IP BUS TO AT LEAST ONE APPLICATION CONNECTED TO THE IP BUS.

FIG. 3

INTERNET PROTOCOL (IP)-ENABLED SMART TRANSDUCER

FIELD

Disclosed embodiments relate to industrial sensing and process control using smart transducers.

BACKGROUND

Process control systems for industrial processes, whether distributed control system (DCS) or supervisory control and data acquisition (SCADA) systems, generally include one or more process controllers communicatively coupled to at least one host (e.g., an operator workstation) and to one or more process control devices (e.g., field devices) configured to communicate via analog, digital or combined analog/digital communication signals and/or protocols. Such process control systems are commonly used in oil and gas, chemical, pharmaceutical, pulp and paper manufacturing and petroleum processes.

The field devices can comprise device controllers, valves, valve actuators or positioners, switches, transmitters (e.g. temperature, pressure, level, flow rate, or chemical composition sensors), performing functions within the process control system such as actuator opening and/or closing valves and gauges or sensors measuring process parameters. The process controller receives signals indicative of process measurements made by the field devices and/or other information pertaining to the field devices, uses this information to implement a control routine, and generates control signals over buses and/or other communication lines to the field devices such as actuators to control the operation of the processing equipment of the process control system.

To provide improved modularity and inter-manufacturer compatibility process controls manufacturers have moved toward decentralization of control within a process by using 'smart' field devices that communicate generally using a serial protocol such as the HART®, PROFIBUS®, WORLDFIP®, Device-Net®, CAN, and Foundation™ Fieldbus (hereinafter "Fieldbus") protocols. These smart field devices are microprocessor-based devices such as sensors, that in some cases, such as with Fieldbus devices, also perform control loop functions traditionally executed by a Distributed Control System (DCS) controller. Because smart field devices provide control capability and communicate using an open protocol, smart field devices from a variety of different manufacturers can typically communicate with one another via a common digital data bus and can interoperate to execute a control loop without the intervention of a DCS controller.

Some industrial automation systems may include a portion of their communications according to the open process control (OPC) Unified Architecture (UA) protocol. OPC UA is an open (non-proprietary) standard for manufacturer-independent data communications which can be machine-to-machine or between applications. OPC UA is primarily used in industrial automation systems and is specified by the OPC Foundation. For example, an industrial automation system may include a gateway device that converts serial protocol data received from the field devices to OPC UA data that is coupled to an OPC UA server which may also make this information available via a network connection to one or more OPC clients operating at another location. The OPC UA clients may utilize OPC UA service calls over a network connection in order to send OPC UA data to and receive OPC UA data from an OPC UA server(s).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize industrial automation system users generally do not have remote visibility into the state, behavior, and/or environment of their processing equipment or devices on the shop floor or in the field. This is because most commercially available field devices (e.g., sensors) do not have the communications capabilities to provide data they sense as Internet protocol (IP) data, and the field devices may also not be able to measure certain physical quantities which may be valuable in helping users improve the product quality, reduce waste and improve yield, in the overall process. Such field devices also often have very limited diagnostics data provided, typically resorting to proprietary codes displayed on the device itself, and some field devices require additional equipment to interpret the data sent. Serial data connectivity is generally used.

Disclosed IP-enabled smart transducers (smart transducers) provide this needed direct visibility into the state, behavior, and/or environment of the processing equipment or devices by providing a sensor for generating field data regarding a physical quantity associated with the processing equipment or a device, along with communications interface that generates IP data, and a transmitter that exposes the IP data to an IP bus. The communications interface includes a processor (digital signal processor (DSP) or microcontroller (MCU)) having an associated memory, and a field data to IP data conversion algorithm for generating IP data from the received conditioned field data, and the transmitter transmits the IP data across the IP bus generally to a plurality of applications connected to the IP bus.

Vendors manufacturing such smart transducers can choose what transport(s) to support depending on whether the IP data communications will be on a local area network (LAN), a private cloud, or a public cloud (i.e., a wide area network (WAN)). The application(s) receiving the IP data can analyze the IP data and in response perform a wide variety of activities involving the industrial process. For example, intralogistics (measure acceleration and temperature of parts moving on bands, in wagons, fork lifts, location), leakage test, pressure test, heat treatment (temperature), drilling and milling (rotation, vibration), scanning (codes), packing (weight), geometric measurement (length, size), flow control (flow, viscosity), joining processes (force, distance), deep-drawing (force, distance), electrical testing (voltage, current, resistance), painting (flow, color), assembly (contact, camera check), screwing (torque, angle), and welding (electricity, wire consumption).

The IP data can be compliant with an open data connectivity standards such as OPC UA. IP data exposed using the OPC UA standard allows disclosed smart transducers to be used on third party process equipment or devices which may lack the ability to measure/sense a particular physical quantity (e.g., pressure, temp, or vibration), and to communicate the sensed field data as IP data. Disclosed smart transducers thus communicate IP data such as using OPC UA 'natively' meaning the IP data client or server is part of the software or digital logic in the smart transducer instead of conventionally having the sensor generate raw data readings first and conveying them to another external component, such as a gateway device, which then exposes the data as IP data using an open data connectivity standard such as OPC UA. Disclosed smart transducers are not limited to any particular method of getting the IP data generated into a remote location such as the cloud or a process floor location.

BRIEF DESCRIPTION OF THE DRAWINGS

FIG. 3 is a flow chart that shows steps in a method of communicating field data sensed in an industrial processing facility as IP data from a disclosed smart transducer, according to an example embodiment.

DETAILED DESCRIPTION

Figure 1:
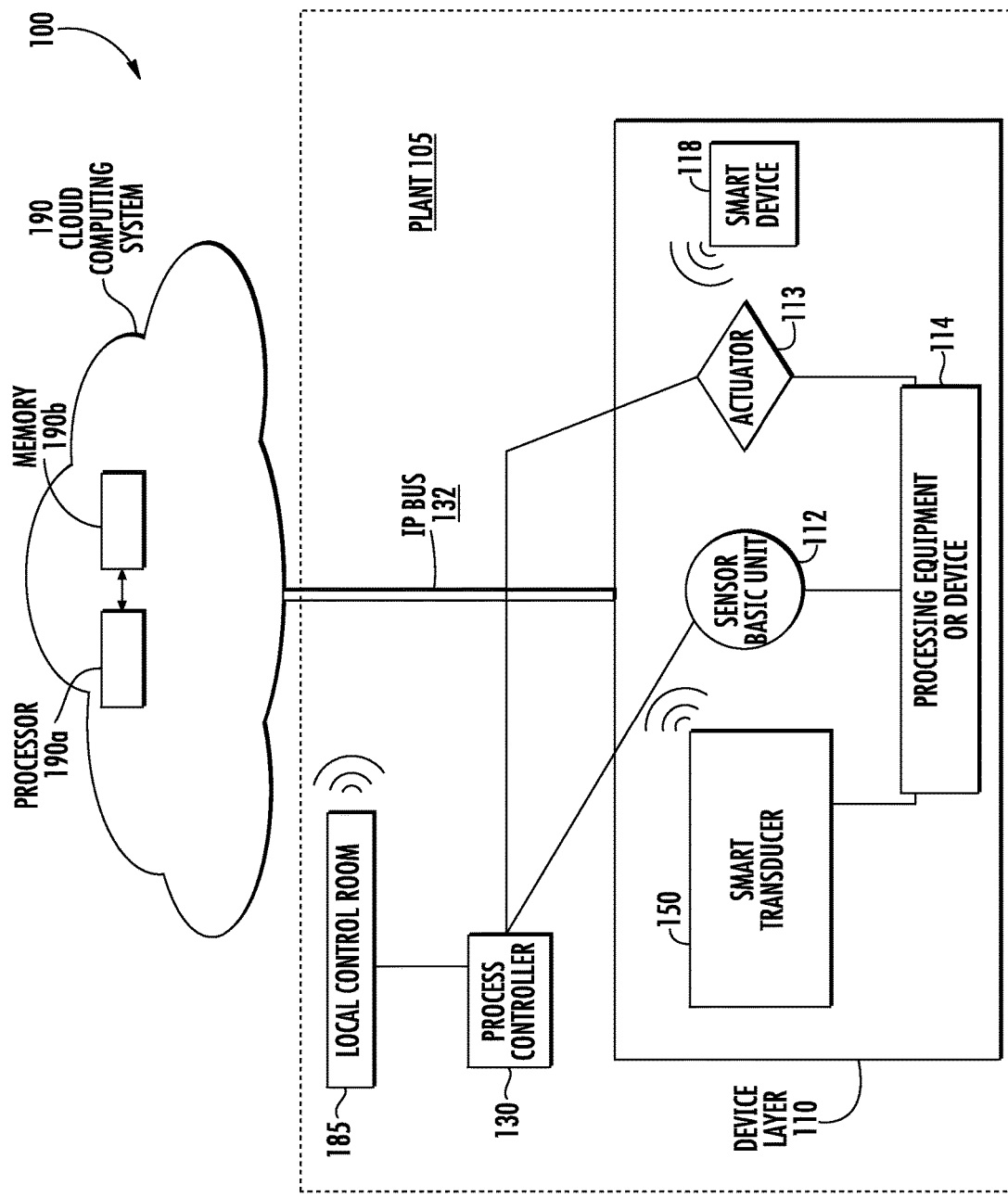
FIG. 1 is a block diagram representation of a process control system for an industrial process facility shown having a disclosed smart transducer coupled to processing equipment or a device that converts field data generated into IP data, and a transmitter for transmitting the IP data across an IP bus to at least one application connected to the IP bus, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram representation of a process control system 100 for an industrial process facility shown as plant 105 having a disclosed IP-enabled smart transducer shown as a "smart transducer" 150. The smart transducer 150 is coupled to processing equipment or a device 114 and converts the field data generated into IP data, and a has transmitter (see transmitter 156 in FIG. 2 described below) for transmitting the IP data across an IP bus 132 to at least one application connected to the IP bus, according to an example embodiment. Internet connections enable fast data interchange between locations which are physically widely separated. In conjunction with an open data connectivity standard technology (e.g., OPC UA), it is thus possible for different systems, applications and devices which can be located physically very widely removed from one another, to communicate with one another simply and quickly.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

The smart transducer 150 provides a real-time view into the state of the processing equipment or device 114 providing valuable information such regarding the quality of the products being produced, and the state of the processing equipment or device being monitored for maintenance and efficiency reasons. The process equipment or device can be on an assembly line such as robot arms, turbines, compressors, or comprise storage tanks in a tank farm. As known in communications, the IP suite is the computer networking model and set of communications protocols used on the Internet and similar computer networks commonly known as TCP/IP based on its most important protocols, the TCP, and the IP being the first networking protocols defined during its development. The IP communications utilized by disclosed smart transducers can comprise, but is not limited to, machine-to-machine (M2M)/IOT known as MQTT, Advanced Messaging Queuing Protocol (AMQP), and OPC UA.

The IP connected applications shown by example in FIG. 1 comprise a local control room 185, a smart device 118 that is in a device layer 110 that can be another IP-enabled smart transducer or other field device with the smart transducer 150, and a cloud computing system 190 that includes a processor 190a and an associated memory 190b. Cloud computing system 190 can provide a cloud-based management system as well a data archiver (data historian). Also shown coupled to the processing equipment or device 114 is a basic sensor unit 112 that lacks both a processor and communications block, and an actuator 113. A process controller 130 (DCS or Programmable Logic controller (PLC)) is shown coupled to the basic sensor unit 112 and to the actuator 113, such as by an Ethernet cable.

Figure 2:
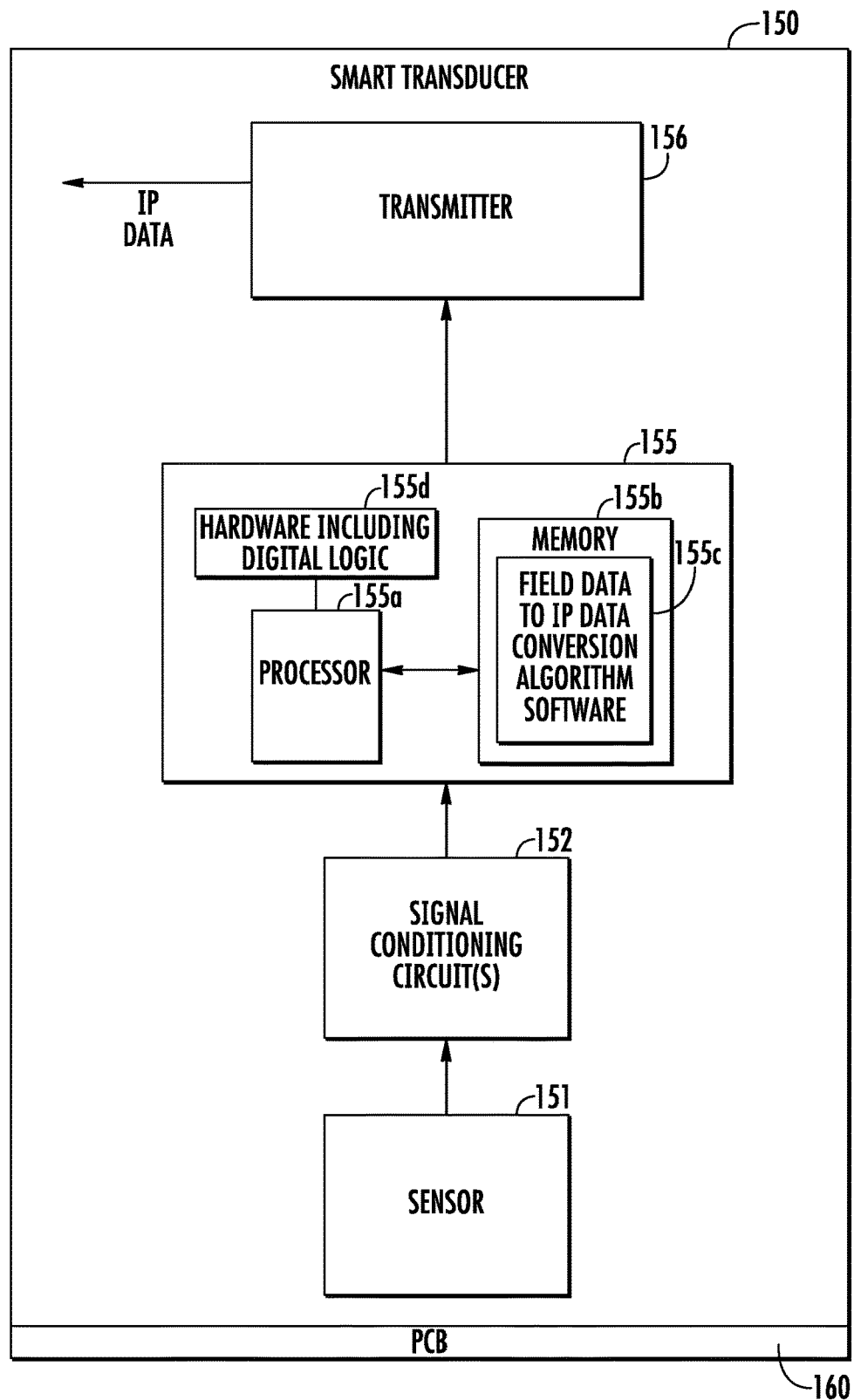
FIG. 2 is a block diagram representation of a disclosed smart transducer, according to an example embodiment.

FIG. 2 is a block diagram representation of a disclosed smart transducer 150, according to an example embodiment shown all mounted on a printed circuit board (PCB) 160. The smart transducer 150 includes a sensor 151 for generating field data regarding a physical quantity associated with the processing equipment or device 114. As known in the art a 'sensor' is a device that acquires a physical quantity and converts it into a signal suitable for signal processing, such as a thermal, mechanical, electrical, or magnetic quantity. Thermal quantities can comprise temperature, thermal conductivity, and mechanical quantities can comprise velocity, acceleration, vibration, force or pressure, strain, stress, pressure, or torque. Electric quantities can comprise charge, voltage, current, electric field (amplitude, phase, polarization), conductivity, permittivity), and magnetic quantities can comprise magnetic field (amplitude, phase, polarization), flux, or magnetic permeability.

A signal conditioning circuit(s) 152 is coupled to an output of the sensor 151 for at least one (and generally both) of amplifying and filtering the field data to provide conditioned field data. A communications interface 155 is coupled to the output of the signal conditioning circuit 152 and includes a processor 155*a* having an associated memory 155*b* shown storing a field data to IP data conversion algorithm software 115*c* for generating the IP data from received conditioned field data. As known in the art, algorithms such as disclosed field data to IP data conversion algorithms may be implemented by hardware or be implemented by software.

Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic 155*d*. Regarding software-based algorithm implementations, field data to IP data conversion algorithm code 115*c* stored in the associated memory 155*b* can be implemented by the processor 155*a*. Only one of the field data to IP data conversion algorithm software 115*c* and hardware including digital logic 155*d* shown in FIG. 2 is needed.

A transmitter 156 is for transmitting the IP data across an Internet connection shown as IP bus 132 in FIG. 1 to at least one application connected to the Internet. For wireless applications an antenna is coupled to an output of the transmitter 156.

The plant 105 in one particular application can be a tank farm including a plurality of tanks or a pipeline metering station. Although the smart transducer is shown in FIG. 1 using wireless communications to communicate IP data to the IP bus 132, wired communications may also be used, such as over an Ethernet cable to the IP bus 132 and/or over the IP bus 132.

The communications interface 155 can further comprises a communications algorithm comprising an authentication and authorization feature which provides secure access to the IP data exclusively to authorized third parties. The field data to IP data conversion algorithm 155*c* can further comprise an edge-processing feature for providing a reduced quantity of the IP data. Edge analytics allows performing pre-processing or filtering of the data closer to where the data is being created. On-board (Edge) logic allows processing of raw sensed data readings. This can help make the data more meaningful and reduce the quantity of data that needs to be sent which enables the smart transducer to only send richer, more relevant data only. For example, temperature readings can become average temperature readings over a given time period so that the IP data that is transmitted is only the maximum, minimum and average temperatures, instead of sending thousands of individual temperature readings. For large-scale Internet of Things (IoT) deployments, edge functionality can be important because of the sheer volumes of data being generated.

As noted above the processing equipment or device the smart transmitter it is associated with can lack an ability to sense a physical quantity and lacks an ability to communicate over the IP bus. The smart transducer can further implement a data encryption algorithm so that the IP data comprises encrypted IP data. Encryption allows users to secure the data it exposes.

The communications interface 155 can further comprise an algorithm for creating a data model for expressing a data hierarchy relevant to the field data and functions performed by the smart transducer, wherein the data model updates values of the field data as updated samples of the field data are generated. Disclosed smart transducers can be used in various production contexts. Depending on who is using the smart transducers and for what purpose, the data can be structured by modification to best suit the scenario it is used for. Once the data structure is set, the smart transducers can then populate that structure with the values it generates. For example, a smart transducer may have the ability to make various measurements (e.g. pressure, temperature) depending on what probes are attached to it. When different probes are attached, the type of measurement that probe makes (e.g., pressure hence maximum pressure, minimum pressure, average, current value, and associated units) could be added to available address space. If a temperature probe is attached, units and temperature related values can be made available.

FIG. 3 is a flow chart that shows steps in a method 300 of communicating field data sensed in an industrial processing facility as IP data from a disclosed smart transducer, according to an example embodiment. Step 301 comprises providing a smart transducer including a sensor coupled to processing equipment or a device in the industrial processing facility, a signal conditioning circuit coupled to an output of the sensor, a communications interface coupled to the signal conditioning circuit implementing field data to IP data conversion algorithm, and a transmitter.

Step 302 comprises the sensor generating the field data regarding a physical quantity associated with the processing equipment or device. Step 303 comprises the signal conditioning circuit providing at least one of amplifying and filtering the field data to provide conditioned field data. Step 304 comprises the field data to IP data conversion algorithm generating the IP data from the conditioned field data. Step 305 comprises the transmitter transmitting the IP data across an IP bus to at least one application connected to the IP bus, such as to a cloud computing system.

Disclosed embodiments can be applied to generally to either new equipment or existing equipment. For example, the ability of disclosed smart transducers to collect sensor data and expose it to an IP bus (e.g., via OPC UA) makes it particularly useful for existing equipment installations (aka. Brown field sites) because it is augmenting the data visibility otherwise not available from legacy systems.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. An Internet Protocol (IP)-enabled smart transducer, comprising:

a sensor for generating field data regarding a physical quantity associated with processing equipment or a device in an industrial processing facility;

a signal conditioning circuit coupled to an output of said sensor for at least one of amplifying and filtering said field data to provide conditioned field data;

a communications interface coupled to said signal conditioning circuit, said communications interface including a processor having an associated memory, and a field data to IP data conversion algorithm for generating IP data from said conditioned field data, and a transmitter for transmitting said IP data across an IP bus to at least one application connected to said IP bus.

2. The smart transducer of claim 1, wherein said field data to IP data conversion algorithm is stored as software in said associated memory that is implemented by said processor.

3. The smart transducer of claim 1, wherein said field data to IP data conversion algorithm is realized in hardware comprising digital logic.

4. The smart transducer of claim 1, wherein said IP data comprises an open data connectivity standard data which enables data exchange between apparatus from different manufacturers and across different operating systems.

5. The smart transducer of claim 1, wherein said communications interface further comprises a communications algorithm comprising an authentication and authorization feature which provides secure access to said IP data exclusively to authorized third parties.

6. The smart transducer of claim 1, wherein said field data to IP data conversion algorithm further comprises an edge-processing feature for providing a reduced quantity of said IP data.

7. The smart transducer of claim 1, wherein said processing equipment or said device lacks an ability to sense said physical quantity and lacks an ability to communicate over said IP bus.

8. The smart transducer of claim 1, wherein said smart transducer further implements a data encryption algorithm so that said IP data comprises encrypted IP data.

9. The smart transducer of claim 1, wherein said physical quantity comprises a thermal quantity, mechanical quantity, electric quantity, or magnetic quantity.

10. The smart transducer of claim 1, wherein said communications interface further comprises an algorithm for creating a data model for expressing a data hierarchy relevant to said field data and functions performed by said smart transducer, wherein said data model updates values of said field data as updated samples of said field data are generated.

11. A method of communicating field data sensed in an industrial processing facility, comprising:

providing an Internet Protocol (IP)-enabled smart transducer including a sensor coupled to processing equipment or a device in said industrial processing facility, a signal conditioning circuit coupled to an output of said sensor, a communications interface coupled to said signal conditioning circuit, said communications interface including a field data to IP data conversion algorithm, and a transmitter, said sensor generating said field data regarding a physical quantity associated with said processing equipment or said device;

said signal conditioning circuit providing at least one of amplifying and filtering said field data to provide conditioned field data, said field data to IP data conversion algorithm generating IP data from said conditioned field data, and said transmitter transmitting said IP data across an IP bus to at least one application connected to said IP bus.

12. The method of claim 11, wherein said field data to IP data conversion algorithm is stored as software in an associated memory that is implemented by a processor.

13. The method of claim 11, wherein said field data to IP data conversion algorithm is realized in hardware comprising digital logic.

14. The method of claim 11, wherein said IP data comprises an open data connectivity standard data which enables data exchange between apparatus from different manufacturers and across different operating systems.

15. The method of claim 11, wherein said communications interface further comprises a communications algorithm comprising an authentication and authorization feature, further comprising using said authentication and authorization feature to provide secure access to said IP data exclusively to authorized third parties.

16. The method of claim 11, wherein said field data to IP data conversion algorithm further comprises an edge-processing feature, further comprising using said edge-processing feature for providing a reduced quantity of said IP data.

17. The method of claim 11, wherein said processing equipment or said device lacks an ability to sense said physical quantity and lacks an ability to communicate over said IP bus.

18. The method of claim 11, wherein said smart transducer further implements a data encryption algorithm, further comprising encrypting said IP data to provide encrypted IP data to said IP bus.

19. The method of claim 11, wherein said physical quantity comprises a thermal quantity, mechanical quantity, electric quantity or a magnetic quantity.

20. The method of claim 11, wherein said communications interface further comprises an algorithm for creating a data model for expressing a data hierarchy relevant to said field data and functions performed by said smart transducer, further comprising updating values of said field data as updated samples of said field data are generated.

* * * * *